United States Patent
Budinger et al.

(10) Patent No.: US 8,124,245 B2
(45) Date of Patent: Feb. 28, 2012

(54) BLAZE CLADDING FOR DIRECT METAL LASER SINTERED MATERIALS

(75) Inventors: David Edwin Budinger, Loveland, OH (US); Ronald Lance Galley, Mason, OH (US); Ashwin Sreekant Raghavan, Dayton, OH (US); David Allen Kastrup, West Chester, OH (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 12/775,563

(22) Filed: May 7, 2010

(65) Prior Publication Data

US 2010/0221567 A1 Sep. 2, 2010

Related U.S. Application Data

(62) Division of application No. 11/312,731, filed on Dec. 20, 2005.

(51) Int. Cl.
*B23K 1/00* (2006.01)
*B22F 3/24* (2006.01)
*B22F 3/26* (2006.01)

(52) U.S. Cl. ......... 428/550; 419/27; 419/61; 228/262.9; 428/553; 428/680; 428/683

(58) Field of Classification Search .................. None
See application file for complete search history.

(56) References Cited

U.S. PATENT DOCUMENTS

| | | | | |
|---|---|---|---|---|
| 3,678,567 A * | 7/1972 | Manilla et al. | ............... | 228/131 |
| 3,753,704 A * | 8/1973 | Manilla et al. | ............... | 419/8 |
| 4,501,768 A * | 2/1985 | Kumar | ............... | 427/560 |
| 4,505,060 A * | 3/1985 | Bell et al. | ............... | 40/27.5 |
| 4,551,184 A * | 11/1985 | Bell et al. | ............... | 148/518 |
| 5,070,591 A * | 12/1991 | Quick et al. | ............... | 29/527.4 |
| 5,184,662 A * | 2/1993 | Quick et al. | ............... | 164/97 |
| 5,321,228 A * | 6/1994 | Krause et al. | ............... | 219/121.84 |
| 5,338,941 A * | 8/1994 | Sappok | ............... | 250/506.1 |
| 5,547,517 A * | 8/1996 | Iwai | ............... | 148/24 |
| 5,927,373 A * | 7/1999 | Tobin | ............... | 164/36 |
| 6,073,518 A * | 6/2000 | Chow et al. | ............... | 76/108.2 |
| 6,089,123 A * | 7/2000 | Chow et al. | ............... | 76/108.2 |
| 6,112,804 A * | 9/2000 | Sachs et al. | ............... | 164/348 |
| 6,354,361 B1* | 3/2002 | Sachs et al. | ............... | 164/128 |
| 6,613,397 B2* | 9/2003 | Oh | ............... | 427/540 |
| 6,699,593 B2* | 3/2004 | Kaneta et al. | ............... | 428/670 |
| 2002/0015654 A1* | 2/2002 | Das et al. | ............... | 419/8 |
| 2002/0148817 A1* | 10/2002 | Tewari | ............... | 219/121.64 |
| 2003/0143096 A1* | 7/2003 | Shimizu et al. | ............... | 419/9 |

* cited by examiner

*Primary Examiner* — Jennifer McNeil
*Assistant Examiner* — Jason Savage
(74) *Attorney, Agent, or Firm* — William Scott Andes; Gary M. Hartman; Domenica N.S. Hartman

(57) ABSTRACT

A direct metal laser sintered material including a substrate formed from a laser sintering process, the substrate having at least one surface, and a cladding material brazed onto at least a portion of the surface.

18 Claims, 1 Drawing Sheet

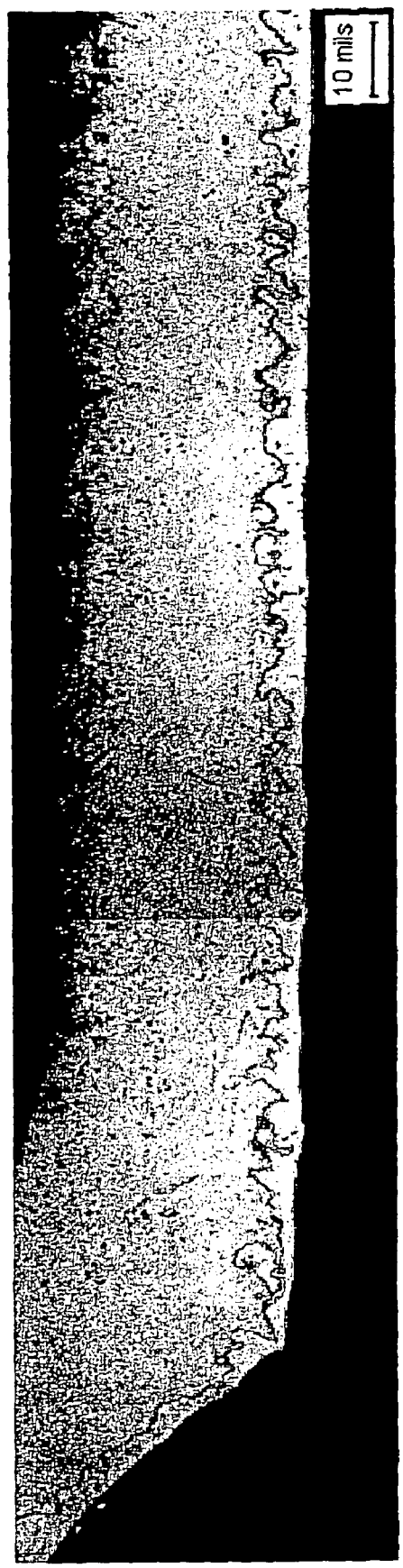

BLAZE CLADDING FOR DIRECT METAL LASER SINTERED MATERIALS

CROSS REFERENCE TO RELATED APPLICATIONS

This is a division patent application of U.S. patent application Ser. No. 11/312,731, filed Dec. 20, 2005, now abandoned.

BACKGROUND OF THE INVENTION

The present application relates to surface treatments for direct metal laser sintered materials and the like and, more particularly, to braze claddings for direct metal laser sintered materials.

Rapid prototyping techniques, such as direct metal laser sintering ("DMLS"), have been used to rapidly prototype and manufacture various mechanical parts, such as fuel nozzles and fuel circuits for aircraft engines. Rapid prototyping techniques typically operate by depositing multiple layers of material, thereby incrementally (i.e., in layers) forming the overall part. Each layer may be about 5 to about 100 pm thick, depending on the technique used and the type of material being deposited.

The DMLS process has been used to form metallic parts using a laser sintering process. In particular, the DMLS process precisely deposits metal powders in thin layers and the deposited powders are sintered by the laser, thereby forming a generally rigid layer. The metal powders may be steel-based powders, bronze-based powders or the like.

Despite the advantages (e.g., prototyping time savings) achieved by the DMLS process, direct metal laser sintered materials often are porous and include crevices, ridges, interconnected channels and other surface defects. The channels may potentially give rise to leaks (e.g., fuel leaks) and the surface defects may provide locations where particles and debris may be deposited, thereby obstructing fluid flow and/or causing turbulent flow. For example, surface defects may increase the tendency for coke formation in fuel circuits formed from direct metal laser sintered materials. Furthermore, direct metal laser sintered materials may be used in highly corrosive environments (e.g., as fuel nozzles in direct contact with fuel) and therefore may be subjected to chemical degradation.

Accordingly, there is a need for a system and method for treating the surface of direct metal laser sintered materials to improve corrosion resistance and reduce surface defects.

BRIEF DESCRIPTION OF THE INVENTION

In one aspect, a direct metal laser sintered material is provided; wherein the direct metal laser sintered material includes a substrate formed from a laser sintering process, the substrate having at least one surface, and a cladding material brazed onto at least a portion of the surface.

In another aspect, a method for treating a surface of a laser sintered material is provided. The method includes the steps of applying a cladding material to at least a portion of the surface of the laser sintered material and heating the cladding material such that the cladding material melts and wets the surface.

In another aspect, a direct metal laser sintered material is provided, wherein the direct metal laser sintered material includes a substrate formed by laser sintering a steel-based powder and a gold/nickel alloy cladding material brazed onto at least a portion of the substrate.

Other aspects of the present invention will become apparent from the following detailed description and the appended claims.

BRIEF DESCRIPTION OF THE DRAWING

FIG. 1 is a photograph of the longitudinal cross section of a direct metal laser sintered material having an untreated outer (i.e., top) surface and an inner (i.e., bottom) surface treated with a cladding material, wherein FIG. 1 shows the cladding material as completely filling crevices, ridges, interconnected channels and/or other surface defects of the direct metal laser sintered material according to an aspect of the present invention.

DETAILED DESCRIPTION OF THE INVENTION

As used herein, "direct metal laser sintered material" refers to any material, device, part or component subjected to, formed from or formed during a laser sintering process. In one aspect, the direct metal laser sintered material includes generally non-shrinking metal 'powders sintered by a laser. In another aspect, the direct metal laser sintered material includes a bronze-based matrix including Ni, a steel-based matrix including Ni or a steel alloy containing Cr, Ni, Mo, Si, V and/or C. For example, direct metal laser sintered materials may include DirectSteel 50, DirectSteel 20, DirectSteel H20, DirectMetal 50 and DirectMetal20. DirectSteel and DirectMetal are registered trademarks of EOS GmbH Electro Optical Systems.

According to one aspect of the present invention, a cladding material may be applied to the surface of a direct metal laser sintered material and brazed at the appropriate temperature for the appropriate time, thereby allowing the cladding material to melt, flow and wet the surface of the direct metal laser sintered material. As the cladding material wets the surface of the material, the cladding material may flow through and fills the crevices, ridges, interconnected channels and/or other surface defects of the direct metal laser sintered material, leaving a generally smooth and/or more corrosion resistant surface.

In another aspect, the composition of the cladding material may be selected such that the cladding material is corrosion resistant. For example, corrosion resistance may be achieved by using a cladding material having a high gold (or other precious metal) content. In another aspect, the composition of the cladding material may be selected such that the cladding material is ductile, thereby preventing cracking during thermal cycling. For example, ductility may be achieved by using a cladding material having a high copper content. In another aspect, the composition of the cladding material may be selected such that the cladding material has improved wet-ability. For example, wet-ability may be increased by increasing the nickel content of the cladding material.

The cladding material according to an aspect of the present invention may be any material capable of melting, flowing and wetting the surface of direct metal laser sintered materials. In one aspect, the cladding material may include silver alloys. In another aspect, the cladding material may include nickle alloys. In another aspect, the cladding material may include precious metal (e.g., gold and/or palladium) alloys. In another aspect, the cladding material may include cobalt alloys.

In one aspect, a silver alloy cladding material may include at most about 93 wt % silver, at most about 43 wt % copper, at most about 35 wt % zinc, at most about 5 wt % nickel, at most about 10.5 wt % tin, at most about 0.5 wt % lithium and/or at most about 14 wt % manganese, with at most about 0.15 wt % other elements.

A first example of a silver alloy cladding material according to an aspect of the present invention is AMS 4765 or the like and may include about 47 to about 65 wt % Ag, about 41 to about 43 wt % Cu and about 1.5 to about 2.5 wt % Ni.

A second example of a silver alloy cladding material according to an aspect of the present invention is AMS 4772 or the like (solidus temperature of about 1325° F. and liquidus temperature of about, 1575° F.) and may include about 53 to about 55 wt % Ag, about 39 to about 41 wt % Cu, about 4 to about 6 wt % Zn and about 0.5 to about 1.5 wt % Ni, with up to about 0.15 wt % other elements.

In one aspect, a nickel alloy cladding material may include at most about 91.5 wt % nickel, at most about 18 wt % chromium, at most about 3.5 wt % boron, at most about 8 wt % silicon, at most about 5 wt % iron, at most about 0.9 wt % carbon, at most about 12 wt % phosphorus, at most about 0.02 wt % sulfur, at most about 0.05 164919/067988-014 wt % aluminum, at most about 0.05 wt % titanium, at most about 24.5 wt % manganese, at most about 5 wt % copper, at most about 0.05 wt % zirconium, at most about 17 wt % tungsten, at most about 0.1 wt % cobalt and/or at most about 0.0005 wt % selenium, with at most about 0.5 wt % other elements.

A first example of a nickel alloy cladding material according to an aspect of the present invention is AMS 4777 or the like (solidus temperature of about 1780 OF and liquidus temperature of about 1830 OF) and may include about 6 to about 8 wt % Cr, about 2.75 to about 3.5 wt % B, about 4 to about 5 wt % Si, about 2.5 to about 3.5 wt % Fe, at most about 0.06 wt % C, at most about 0.02 wt % P, at most about 0.02 wt % S, at most about 0.05 wt % Al, at most about 0.05 wt % Ti, at most about 0.05 wt % Zr, at most about 0.005 wt % Se, at most about 0.1 wt % Co, at most about 0.5 wt % other elements and the balance Ni.

A second example of a nickel alloy cladding material according to an aspect of the present invention is AMS 4778 or the like (solidus temperature of about 1796 OF and liquidus temperature of about 1904 OF) and may include about 2.75 to about 3.5 wt % by about 4 to about 5 wt % Si, at most about 0.5 wt % Fe, at most about 0.06 wt % C, at most about 0.02 wt % P, at most about 0.02 wt % S, at most about 0.05 wt % Al, at most about 0.05 wt % Ti, at most about 0.05 wt % Zr, at most about 0.005 wt % Se, at most about 0.1 wt % Co, at most about 0.5 wt % other elements and the balance Ni.

A third example of a nickle alloy cladding material according to an aspect of the present invention is AMS 4779 or the like (solidus temperature of about 1800 OF and liquidus temperature of about 1950 OF) and may include about 1.5 to about 2.2 wt % B, about 3 to about 4 wt % Si, at most about 1.5 wt % Fe, at most about 0.06 wt % C, at most about 0.02 wt % P, at most about 0.02 wt % S, at most about 0.05 wt % Al, at most about 0.05 wt % ti, at most about 0.05 wt % Zr, at most about 0.005 wt % Se, at most about 0.1 wt % Co, at most about 0.5 wt % other elements and the balance Ni.

A fourth example of a nickel alloy cladding material according to an aspect of the present invention is AMS 4782 or the like (solidus temperature of about 1975° F. and liquidus temperature of about 2075 OF) and may include at most about 0.05 wt % B, about 9.75 to about 10.5 wt % Si, at most about 0.5 wt % Fe, at most about 0.1 wt % C, at most about 0.02 wt % P, at most about 0.02 wt % S, at most about 0.05 wt % Al, at most about 0.05 wt?! Ti, at most about 0.05 wt % Zr, at most about 0.005 wt % Se, at most about 0.1 wt?? Co, at most about 0.5 wt % other elements and the balance Ni.

In one aspect, a precious metal alloy cladding material may include at most about 82 wt % gold, at most about 62.9 wt % copper, at most about 60 wt % palladium, at most about 66.5 wt?! nickel, at most about 13 wt % chromium, at most about 2.6 wt % iron, at most about 3.8 wt % silicon and/or at most about 2.4 wt % boron, with at most about 0.15 wt % other elements.

A first example of a precious metal alloy cladding material according to an aspect of the present invention is AMS 4787 or the like (solidus and liquidus temperature at about 1740 OF) and may include about 81.5 to about 82.5 wt?? Au and about 17.5 to about 18.5 wt % Ni.

A second example of a precious metal alloy cladding material according to an aspect of the present invention is AMS 4784 or the like (solidus temperature of about 2015 OF and liquidus temperature of about 2050 OF) and may include about 49.5 to about 50.5 wt % Au, about 24.5 to about 25.5 wt % Ni and about 24.5 to about 25.5 wt % palladium.

A third example of a precious metal alloy cladding material according to an aspect of the present invention is AMS 4785 or the like (solidus temperature of about 2075 OF and liquidus temperature of about 2130 OF) and may include about 29.5 to about 30.5 wt % Au, about 35.5 to about 36.5 wt % Ni and about 33.5 to about 34.5 wt % palladium.

A fourth example of a precious metal alloy cladding material according to an aspect of the present invention is AMS 4786 or the like (solidus temperature of about 1845 OF and liquidus temperature of about 19 15 OF.) and may include about 69.5 to about 70.5 wt % Au, about 21.5 to about 22.5 wt % Ni and about 7.5 to about 8.5 wt % palladium.

A fifth example of a precious metal alloy cladding material according to an aspect of the present invention is B50TF145 (Au 6) or the like (solidus temperature of about 1845 OF and liquidus temperature of about 19 15 OF.) and may include about 20 to about 21 wt % Au, about 3.0 to about 3.6 wt % Si, about 1.8 to 2.4 wt % B, about 5 to about 6 wt % Cr, about 1.7 to about 2.8 wt % Fe, at most about 0.5 wt % Co, at most about 0.001 wt % Zn, at most about 0.001 wt % Cd, at most about 0.002 wt % Pb, at most about 0.002 wt % P, at most about 0.03 wt % C, at most about 0.005 wt % Se, at most about 0.01 wt % S, at most about 0.02 wt % 0 and the balance Ni, with at most about 0.1 wt % other elements.

A sixth example of a precious metal alloy cladding material according to an aspect of the present invention is B50TF198 (~~85) or the like (solidus temperature of about 1725 OF and liquidus temperature of about 1780 OF) and may include about 30 to about 3 1 wt % Pd, about 2.3 to 2.6 wt % B, about 10 to about 11 wt % Cr, at most about 0.02 wt % N, at most about 0.05 wt % Mo, at most about 0.05 wt % Zr, at most about 0.03 wt % C, at most about 0.01 wt % S, at most about 0.002 wt % P, at most about 0.005 wt % Se, at most about 0.05 wt % W and at most about 0.02 wt % 0, at most about 0.5 wt % Fe, at most about 0.05 wt % Ti and at most about 0.1 wt % Mn, with at most about 0.1 wt % other elements.

In one aspect, a cobalt alloy cladding material may include at most about 93 wt % cobalt, at most about 18 wt % nickel, at most about 20 wt % chromium, at most about 8.5 wt % silicon, at most about 4 wt % boron, at most about 5 wt % tungsten, at most about 0.5 wt % carbon, at most about 0.05 wt % titanium, at most about 0.05 wt % aluminum, at most about 0.05 wt % zirconium, at most about 0.005 wt % selenium, at most about 0.02 wt % phosphorus and/or at most about 0.02 wt % sulfur, with at most about 0.1 wt % other elements.

An example of a cobalt alloy cladding material according to an aspect of the present invention is AMS 4783 or the like (solidus temperature of about 2050 OF and liquidus temperature of about 2100 OF) and may include about 16 to about 18 wt % Ni, about 18 to about 20 Wto! Cr, about 7.5 to about 8.5 wt % Si, about 0.7 to about 0.9 wt % B, about 3.5 to about 4.5 wt?hW, about 0.35 to about 0.45 wt % C, at most about 0.05 wt % Ti, at most about 0.05 wt % Al, at most about 0.05 wt % Zr, at most about 0.005 wt % Se, at most about 0.02 wt % P, at most about 0.02 wt % S and the balance Co.

At this point, those skilled in the art will appreciate that various compositions of cladding materials are useful according to the present invention. In particular, the compositions of the cladding material may be selected such that the cladding material melts, flows and wets the surface of the direct metal laser sintered material substrate during brazing. Furthermore, the compositions may be selected such that the cladding materials provides improved corrosion resistance, ductility and/or durability.

The cladding material may be applied to the direct metal laser sintered material in powdered form. Alternatively, the cladding material may be a paste, a wire, a film (e.g., a layered or laminated film) or the like. Those skilled in the art will appreciate that the physical form of the cladding material may be selected to facilitate application of the cladding material to the surface of the direct metal laser sintered material prior to brazing.

The direct metal laser sintered material substrate may be treated according to an aspect of the present invention by applying an appropriate cladding material to a surface of the substrate. For example, a powdered cladding material may be randomly applied to a surface of the substrate. Alternatively, a powdered cladding material may be evenly distributed over a surface of the substrate. The substrate and cladding material may be heated to the appropriate brazing temperature for the appropriate amount of time under the appropriate conditions (e.g., a vacuum or atmospheric pressure) such that the cladding material melts, flows an wets the surface. Any known brazing technique may be used. For example, the cladding material may be heated by induction heating or, alternatively, the substrate and cladding material may be heated in a furnace.

Accordingly, capillary forces created by the crevices and other surface defects of the direct metal laser sintered material may cause the molten cladding material to wet and generally evenly distribute across the surface of the material. Therefore, complete coverage of various regular and irregular surfaces having various geometric configurations (e.g., the internal passage of a fuel nozzle) may be obtained.

EXAMPLE 1

A direct metal laser sintered material was formed from DirectSteel H20 and had a top surface and a bottom surface. The bottom surface was coated with about 1.4 grams of AMS 4787 (i.e., a braze powder including about 82 wt % gold and about 18 wt % nickel), which is generally corrosion resistant. The substrate and braze powder were brazed at about 1850° F for about 10 minutes. A photograph of the substrate after brazing is provided at FIG. 1. In particular, the outer surface (i.e., the top surface in FIG. 1) of the substrate remained rough and abrasive, while the inner surface (i.e., the bottom surface in FIG. 1) had a smooth and protected finish. In particular, FIG. 1 shows so the resulting cladding material as completely filling crevices, ridges, interconnected channels and/or other surface defects of the direct metal laser sintered material.

EXAMPLE 2

The cladding material of Example 1 was replaced with AMS 4772, a silver/copper/zinc/nickel cladding material and the substrate was brazed at about 1700 OF. for about 10 minutes. The resulting substrate had a smooth and treated finish.

Accordingly, the surface of direct metal laser sintered materials, including the surface of hard-to-reach internal passages, may be treated to increase corrosion resistance and durability and to reduce or eliminate surface defects by treating the surface of the materials with appropriate cladding materials.

At this point, those skilled in the art will appreciate that channels (e.g., the internal channels of he1 nozzles) having surfaces treated as described above may provide improved, laminar fluid flow with a reduced likelihood for leaks.

Although the present invention is described herein with respect to certain aspects, modifications may occur to those skilled in the art upon reading the specification. The present invention includes all such modifications and is limited only by the scope of the claims.

The invention claimed is:

1. A method for treating a surface of a laser sintered material, the method comprising the steps of:
    forming a substrate by a laser sintering process so as to comprise sintered powder particles and contain porosity, said substrate having an internal surface that contains crevices and defines an internal passage of said component and an oppositely-disposed second surface;
    applying a braze material to a portion but not all of said internal surface of said substrate; and
    heating said braze material such that said braze material melts and wets said internal surface and flows by capillary forces created by said crevices to become evenly distributed on said internal surface and form a cladding layer that completely fills said crevices in said internal surface and causes said internal surface to be smoother and protected relative to said second surface.

2. The method of claim 1 wherein said braze material is applied to said internal surface as a powder.

3. The method of claim 1 wherein said applying step comprises randomly applying said braze material on said internal surface.

4. The method of claim 1 wherein said laser sintering process is a direct metal laser sintering process.

5. The method of claim 1 wherein said substrate is formed by laser sintering a powder material containing at least one material chosen from the group consisting of bronze-based matrix materials containing nickel, steel-based matrix materials containing nickel, and steel alloys containing chromium, nickel, molybdenum, silicon, vanadium, and/or carbon.

6. The method of claim 1 wherein said braze material has a composition selected such that said cladding layer is corrosion resistant.

7. The method of claim 1 wherein said cladding layer has the following composition: about 82 wt % gold and about 18 wt % nickel.

8. The method of claim 1 wherein said cladding layer is an alloy selected from the group consisting of AMS 4765, AMS 4772, AMS 4777, AMS 4778, AMS 4779, AMS 4782, AMS 4787, AMS 4784, AMS 4785, AMS 4786, B5OTF145 and B5OTF198.

9. The method of claim 1 wherein said heating step includes heating said braze material to a temperature in excess of a liquidus temperature of said braze material.

10. The method of claim 1 wherein said heating step is conducted under a protective atmosphere, said protective atmosphere including at least one of a vacuum, an argon atmosphere and a hydrogen atmosphere.

11. The method of claim 1 wherein said substrate is a portion of a fuel circuit component of a gas turbine engine, said internal surface of said component is a fuel contact surface that defines a fuel passage, and said cladding layer inhibits fuel leakage through said substrate.

12. The method of claim 1 wherein said substrate is formed of a material comprising at least one of a steel-based material and a bronze-based material.

13. The method of claim 12 wherein said steel-based material and said bronze-based material are non-shrinking.

14. The method of claim 1 wherein said substrate is formed of at least one material chosen from the group consisting of bronze-based matrix materials containing nickel, steel-based matrix materials containing nickel, and steel alloys containing chromium, nickel, molybdenum, silicon, vanadium, and/or carbon.

15. The method of claim 1 wherein said cladding layer completely covers said internal surface.

16. The method of claim 1 wherein said braze material has a solidus temperature of at least 1725° F.

17. The method of claim 1 wherein said braze material has a composition containing at least about 20 weight percent of a precious metal.

18. The method of claim 1 wherein said cladding layer extends into but not through said substrate to said second surface.

\* \* \* \* \*